Aug. 15, 1950 W. J. BENNIS 2,518,859

TELEPHONE DIAL RECORDING DEVICE

Filed Nov. 20, 1947 2 Sheets-Sheet 1

Inventor.
William J. Bennis.
by McKnight and Comstock
Attorneys.

TELEPHONE DIAL RECORDING DEVICE

Filed Nov. 20, 1947 2 Sheets-Sheet 2

Inventor.
William J. Bennis.
by McKnight and Comstock
Attorneys.

Patented Aug. 15, 1950

2,518,859

UNITED STATES PATENT OFFICE 2,518,859

TELEPHONE DIAL RECORDING DEVICE

William J. Bennis, Chicago, Ill.

Application November 20, 1947, Serial No. 787,044

4 Claims. (Cl. 179—7)

My invention relates to a telephone dial recording device which records through perforations on a paper tape telephone numbers which have been dialed on a telephone line which is under surveillance.

Among the objects of my invention are to provide a device which can be attached to a telephone line at any point and which will keep an accurate and unmistakable record of all numbers which are dialed on the line; to provide such a device in which neither the user of the telephone, nor the central operator is aware of the connection or operation of my device; to provide such a device in which the numbers dialed are accurately and permanently recorded on a strip of paper tape; to provide such a device which may also be used for listening to or recording conversations which take place over the telephone line, and to provide such a device which is efficient in operation and economical in manufacture and use.

My invention also comprises such other objects, advantages and capabilities as will later more fully appear, and which are inherently possessed by my invention.

While I have shown in the accompanying drawings a preferred embodiment of my invention, yet it is understood that the same is susceptible of modification and change without departing from the spirit of my invention.

Figure 1:
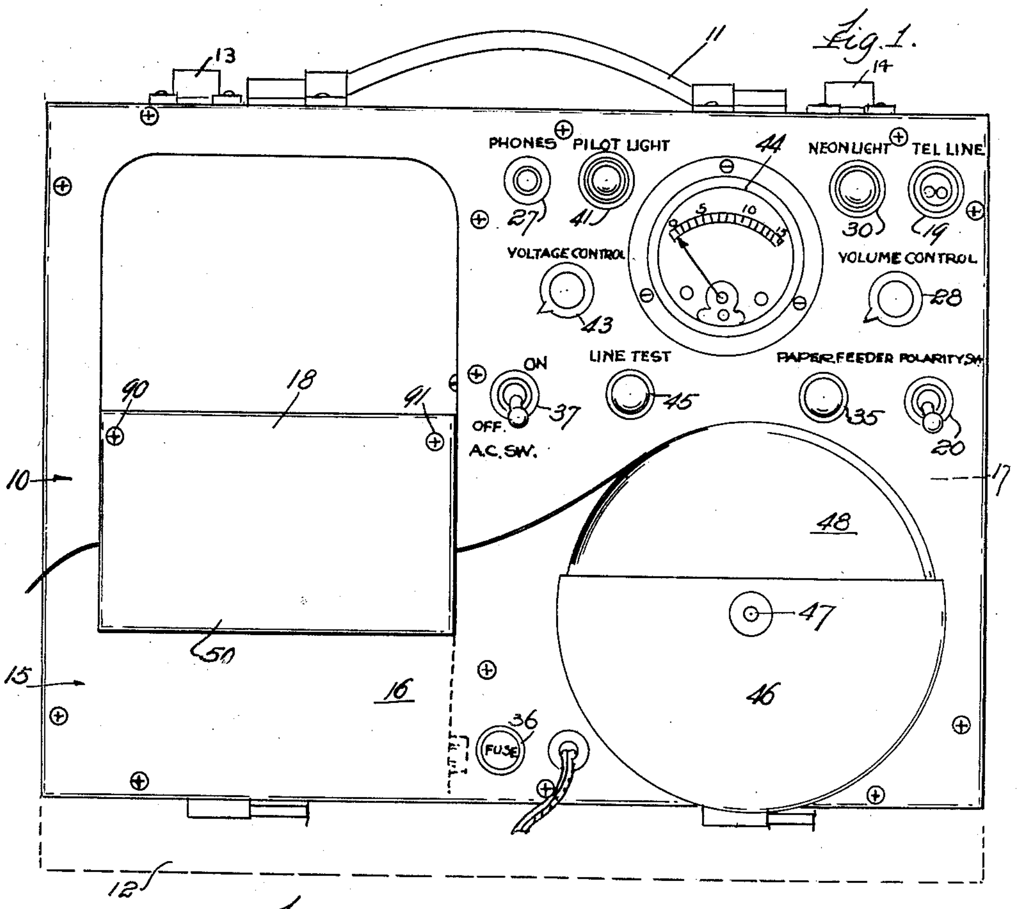
Figure 2:
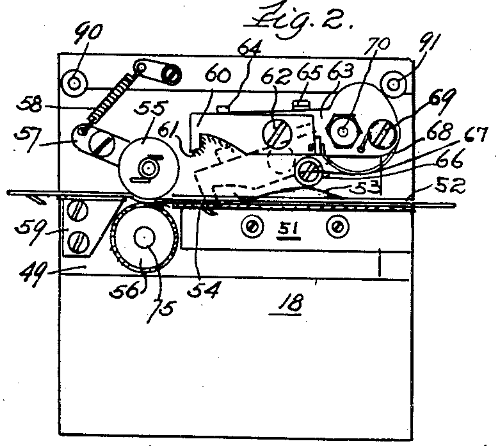
Figure 3:
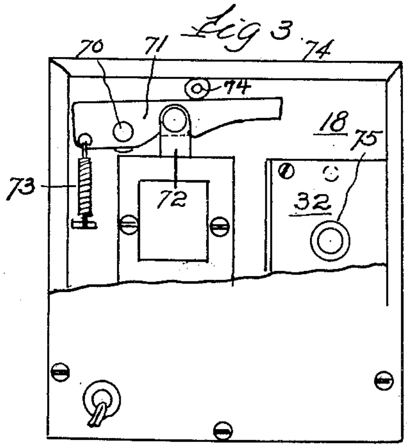
Figure 4:
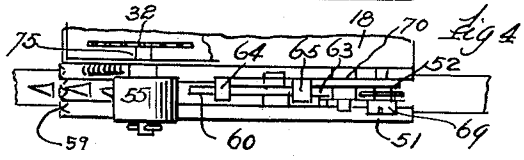
Figures 5, 6:
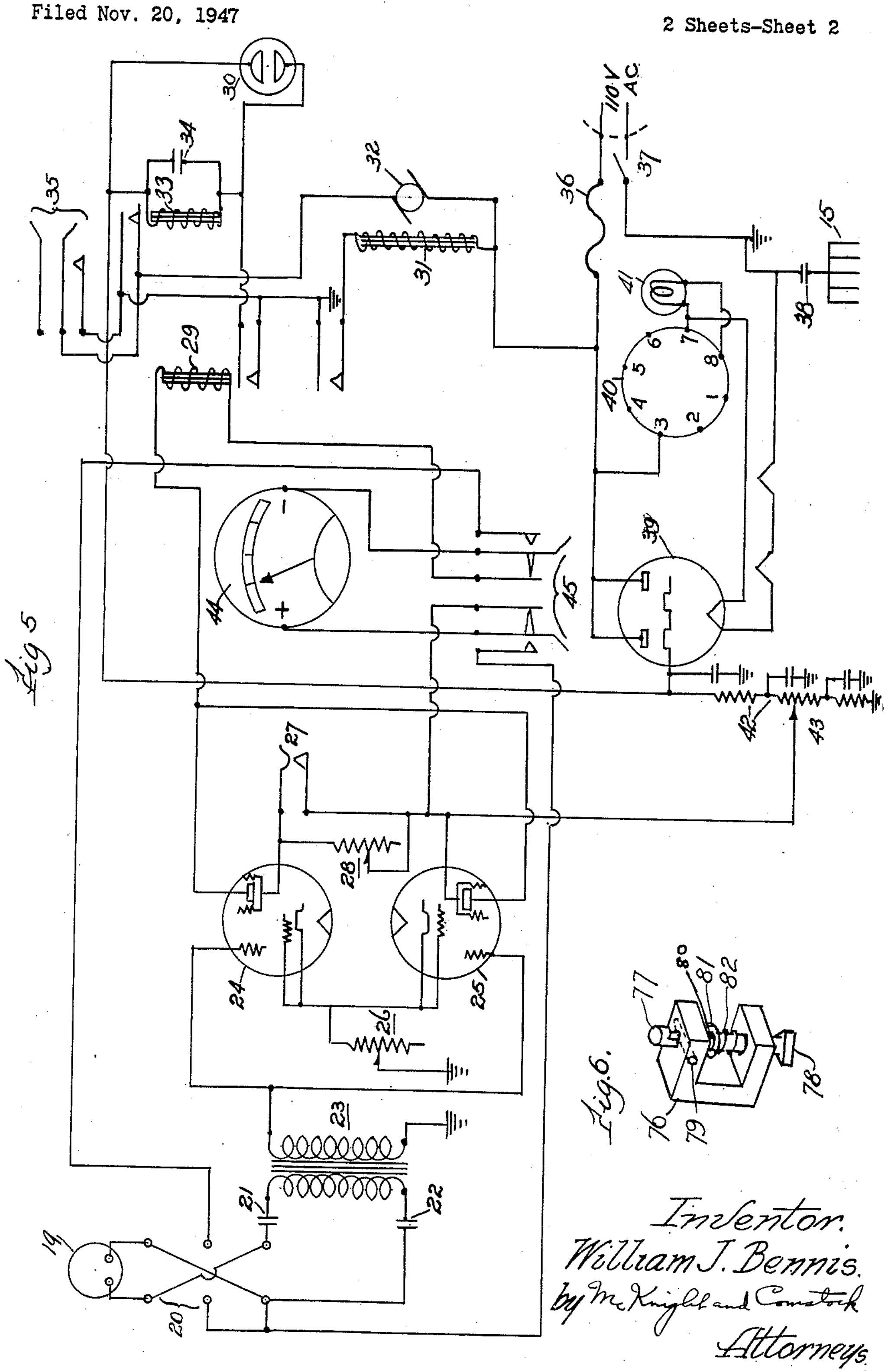

Referring to the drawings, Fig. 1 is a front elevational view of my device; Fig. 2 is a front elevational view of my paper feeding and perforating assembly; Fig. 3 is a detailed sectional view of the rear of my perforating assembly; Fig. 4 is a top plan view of my paper feeding and perforating assembly; Fig. 5 is a schematic circuit diagram of my device and Fig. 6 is a perspective view of an alternative perforating device.

A preferred embodiment of my invention comprises a hollow rectangular carrying case 10, in which are housed all of the electrical and mechanical components of my device. The top of carrying case 10 is provided with a leather carrying handle 11 and has on one side a hinged removable front cover 12, which is held closed by fasteners 13 and 14. Slidably mounted in carrying case 10 and held therein by screws or other suitable means is chassis 15. Chassis 15 comprises a front panel 16 on which are mounted the controls and tape supply for operation of my device, and has on one side an electrical section 17 on which are mounted all of the electrical components, and on the other side a mechanical section 18 on which are mounted all of the mechanical components of my device.

Stored within carrying case 10 above and behind mechanical section 18 are two electrical cords of conventional type which are not shown in the drawings. One of the cords connects my device to a line supply of 110 volt alternating current. The other cord is approximately 10 feet long and has at one end a pair of clamps adapted to establish connection with the two wires of a telephone line. The other end of this cord has a plug which is adapted to fit within socket 19 of my device.

Referring now to the schematic circuit diagram, Fig. 5, socket 19 appears in the upper left hand corner of the drawing. Socket 19 is mounted on front panel 16 and is marked Tel. Line. Through socket 19 signals are received from a selected telephone line which is under surveillance. In series with socket 19 is a polarity switch 20 which is mounted on front panel 16 and marked Polarity Sw. Switch 20 reverses the polarity of the input voltage if it does not match that of my device. Both input lines lead from polarity switch 20 to condensers 21 and 22, which serve to block any indication of the attachment or use of my device from reaching the user of the telephone or central telephone operator. The incoming signal after passing condensers 21 and 22 reaches the primary of input transformer 23.

Across the secondary of input transformer 23 appears the amplified signal voltage, which is connected to the control grids of a pair of amplifier tubes 24 and 25, preferably 6SK7 or 6SJ7 type, which are connected in parallel. The cathode bias of tubes 24 and 25 is controlled by a rheostat 26, which is an internally operated control mounted within electrical section 17 of chassis 15.

Across the screen grids of tubes 24 and 25 is connected a socket 27, which is adapted to receive the plug of a conventional set of earphones. Socket 27 is mounted on front panel 16 and is marked Phones. In connection with socket 27 is rheostat 28, which is mounted on front panel 16 and is marked Volume Control. Rheostat 28 controls the volume of output available at socket 27, which may be used for earphones or for a recording device.

The plates of tubes 24 and 25 are connected to a plate relay 29. Plate relay 29 closes when actuated by a signal from tubes 24 and 25, causing neon light 30 to glow. Neon light 30 is mounted on front panel 16 and is marked Neon Light. Plate relay 29 also closes a circuit connecting the line voltage to a tape perforating solenoid 31, causing the operation of a tape perforator, the mechanical features of which will be explained later in the specification. Plate relay 29 also closes a circuit connecting the line voltage to a motor 32 through a time delay unit comprising a time delay relay 33 in parallel with a condenser 34.

The input signals which result from operation of a dial mechanism comprise a series of pulses, the number of which correspond to the number dialed. These pulses are amplified and cause plate relay 29 to close with each pulse and then open until the next pulse arrives. Accordingly, tape perforator solenoid 31 and neon light 30 operate in pulses. Motor 32, however, is kept in continuous operation during and for a short time after the completion of the input signal pulses by reason of the charging of condenser 34, which discharges through time delay relay 33 and holds closed the line voltage circuit leading to motor 32.

Mounted on front panel 16 is a test switch 35 marked Paper Feeder, which is normally held open by a spring. When held closed by the user of my device, switch 35 causes motor 32 to operate. Switch 35 is used only when a new roll of paper tape is inserted in my device.

My device is adapted to operate on 110 volt alternating current. Mounted on front panel 16 are fuse 36 and toggle switch 37 marked A. C. Sw., which are on opposite sides of the line. Chassis 15 is separated from ground by condenser 38, providing a floating ground for my device. The heaters of amplifier tubes 24 and 25 are in series with the heater of a power tube 39, which is preferably 25Z6, and with ballast tube 40 which is preferably a K80B. Also in this circuit is an indicator light 41, which is mounted on front panel 16, marked Pilot Light, and which glows through a green glass cover when toggle switch 37 is turned on.

The cathode of power tube 39 is connected to a voltage divider 42. Mounted on front panel 16 is a rheostat 43 marked Voltage Control, which is part of voltage divider 42 and which controls the voltage on the screen grids and plates of tubes 24 and 25.

In series with the plate voltage of tubes 24 and 25, and mounted on front panel 16 is a milliammeter 44, which is used for controlling the plate voltage. Mounted on front panel 16 and marked Line Test is testing switch 45, which opens the plate voltage circuit and tests the polarity of the input signal voltage. If the polarity is correct, the indicator of meter 44 will move to the right, and if the polarity is incorrect the indicator of meter 44 will move to the left. If the polarity is incorrect, polarity switch 20 may be changed to correct the polarity of the input voltage.

Line test switch 45 and paper feeder switch 35 are normally in the position shown on the circuit diagram. They are held open by a spring and are closed only when pressure by the operator holds the switch button in a depressed position.

Referring now to the mechanical operation of my device, mounted on the outside of front panel 16 beneath the electrical controls is a paper holder 46, which is slightly larger than a semicircle. Paper holder 46 is provided with a spindle 47, on which is mounted a roll 48 of paper tape ½″ in width. The lower half of paper roll 48 is held within paper holder 46.

To the left of paper holder 46 and mounted on the front of mechanical section 18 of my device is the paper feeding and perforating assembly 49, which is normally concealed by a cover 50 attached by a pair of screws to pillars 90 and 91.

Paper feeding and perforating assembly 49 comprises an L shaped base 51, which is attached by screws to the front of mechanical section 18. Mounted on base 51 by overlapping end brackets, soldering or other suitable means is a paper track 52 through which the end of the roll 48 of paper tape is passed. Track 52 is slightly wider than ½″ and is provided with a slot down the center of its top portion. Mounted on the top of paper track 52 and extending through its open slot is a paper spring 53, which comprises a short piece of wire, which is held against the paper tape as it passes through paper track 52 and which serves to hold the paper down.

Near the opposite end of base 51 is a triangular opening 54, which opening also extends through paper track 52. At the end of base 51 is mounted a pair of rollers 55 and 56, between which the paper tape passes. Rollers 55 and 56 are slightly more than ½″ in width. Roller 55 has a smooth surface and is mounted above the level of base 51. The axis of roller 55 is attached to one end of a lever arm 57. A coil spring 58 exerts upward pressure on the opposite end of lever arm 57, which pivots on an attachment to the front of mechanical section 18 and exerts downward pressure on the axis of roller 55.

Roller 56 has a rough surface and is mounted beneath the level of base 51. It is mounted on a shaft 75, which is geared to motor 32. Motor 32 is contained within the interior of mechanical section 18. The rough surface of roller 56 is adapted to drive the paper tape through the paper feeding and perforating assembly 49.

Beyond rollers 55 and 56 is a small L-shaped paper outlet 59, which is attached to the face of mechanical section 18. Paper outlet 59 has a flat surface and a saw-toothed end which provides a jagged surface for tearing the paper tape after it has passed through my device.

Mounted above the triangular opening 54 in base 51 and paper track 52 is a perforator blade 60, which has at one end a triangular point 61. Blade 60 is pivotally mounted by means of a screw 62 to a perforator arm 63. The top edge of perforator arm 63 is provided with a pair of outwardly extending brackets 64 and 65, which control the maximum movement of perforator blade 60.

Mounted between perforator blade 60 and paper track 52 is a small rolling pivot 66, which is rotatably mounted on a screw 67 attached to the face of mechanical section 18. The lower portion of rolling pivot 66 exerts downward pressure near the base of paper spring 53.

The rear bottom edge of perforator blade 60 contacts rolling pivot 66 and is normally held there by a spring 68. One end of spring 68 is attached to the end of perforator blade 60 and the other end winds around spring holder 69, which is attached to the end of perforator arm 63.

Perforator arm 63 is mounted on shaft 70 and moves with the rotation of said shaft. Shaft 70 extends into the interior of mechanical section 18, where it is attached to solenoid arm 71. Shaft 70 serves as a pivot for solenoid arm 71, which is attached near one end to a solenoid core 72 of tape perforation solenoid 31. The other end of solenoid arm 71 is attached to a coil spring 73. Coil spring 73 holds its end of solenoid arm 71 down, so that the opposite end is held up against a rubber stop member 74, which is mounted on the inside of the face of mechanical section 18.

Solenoid core 72 is normally held in an upward position. When tape perforation solenoid 31 is actuated, solenoid arm 71 is drawn downward into the interior of solenoid 31. This pulls solenoid core 72 downward against the pressure of coil spring 73, causing shaft 70 to rotate.

The rotation of shaft 70 causes perforator arm 63 to move downward. The pressure of bracket 64 causes perforator blade 60 to pivot on screw 62 and rolling pivot 66, causing the triangular point 61 of perforator blade 60 to move downwardly through opening 54 in base 51 and paper track 52. This results in punching a triangular hole in the paper tape which is held within paper track 52.

When solenoid core 72 is released, coil spring 73 and spring 68 cause the perforating mechanism to return to its normal position. The perforating action takes place during the pulses of incoming signal and is a sudden and sharp punching action.

Within mechanical section 18, beside solenoid 31 is motor 32. The shaft of motor 32 drives a series of 3 gears, finally driving shaft 75, which extends through the front of mechanical section 18 and on which roller 56 is mounted.

In operation, my device is connected to a suitable source of 110 volt alternating current at any outlet near where the telephone line under surveillance is available. My device is turned on by moving switch 37 to the "on" position, at which time pilot light 41 should glow. A test dial may be used to check the plate voltage. While the test dial is in operation, meter 44 should read between 4 and 5 ma. Rheostat 43, which is marked Voltage Control is used to regulate the voltage.

Connection is then made with the two wires of the telephone line through the use of the cord which is furnished with my device. The signal from the telephone line enters my device at socket 19. Its polarity should be checked through the use of line test switch 45 and changed through the use of polarity switch 20, if necessary.

When a number is dialed on the telephone line with which connection has been made, the input signal comprises a series of pulses for each number which is dialed. These pulses enter at socket 19, are amplified by transformer 23 and tubes 24 and 25 and operate plate relay 29. The opening and closing of plate relay 29 causes solenoid 31 to set into operation the perforating mechanism described above, resulting in the punching of a series of triangular holes in the paper tape by triangular point 61 of perforator blade 60. Motor 32, due to time delay relay 33 and condenser 34, remains in operation during and for a short time after the dialing of each number. Motor 32 drives shaft 75, which causes roller 56 to turn. The rough edge of roller 56 contacts the paper, which is held between rollers 55 and 56, and causes the paper to move.

The paper tape is thereby caused to move through paper track 52 at a constant rate of speed, while the contact of time delay relay 33 is closed so that the holes punched by triangular point 61 are spaced approximately 1/4" apart. The holes of each number are separated from those of the next number due to the discharge of condenser 34 through time delay relay 33, which causes motor 32 to operate and move the paper tape for a short time after the dial signal has ceased.

It should be noted that due to the shape of triangular point 61 it is impossible for the user to reverse the order in which the holes have been punched and thus reverse the telephone number.

While my device is accurately and unmistakably transcribing on the paper tape the numbers dialed, socket 27 may be used to listen to the conversation or to record it for future use.

Instead of the perforating mechanism described above, I may use a perforator comprising a U-shaped body member 76 and a punch 77 extending through its arms, said punch having a triangular point 78. A pin 79 extends through upper arm of body member 76 and through punch 77 to prevent punch 77 from rotating. A second pin 80 extends through punch 77 and holds a washer 81 surrounding punch 77 between the arms of body member 76. Between washer 81 and the opposite arm of body member 76 is a coil spring 82 which surrounds punch 77. Coil spring 82 holds punch 77 normally in upward position. A portion of punch 77 extends above the top of the upper arm of body member 76 and is adapted to be depressed by the operation of solenoid 31 to effect the punching action.

Having thus described my invention, I claim:

1. A telephone dial recording device adapted to receive a pulsed signal from a selected telephone line and comprising means for amplifying said pulsed signal, a plate relay operated by said amplified pulsed signal, said plate relay closing circuits leading to a perforator and a motor, said motor adapted to move paper tape past said perforator, said perforator adapted to punch holes in said paper tape, a time delay circuit adapted to charge upon the closing of said plate relay and to discharge upon the opening of said plate relay to operate said motor after said plate relay has opened, so as to separate on the paper tape the holes punched by said perforator, so that said holes correspond to the pulsed signal from the telephone line, and means for connecting said device to a suitable source of electrical supply.

2. A telephone dial recording device comprising an input socket adapted to receive a pulsed signal from a selected telephone line, an input transformer and a pair of vacuum tube amplifiers adapted to amplify said signal, a plate relay operated by said amplified signal to close and open a pair of contacts, a time delay relay and condenser in parallel with each other and in series with one of the contacts of said plate relay, said condenser adapted to charge upon the closing of said plate relay contacts and discharge through said time delay relay upon the opening of said plate relay, said time delay relay adapted to close and open a contact, a tape perforation solenoid operated by the other contact opened and closed by said plate relay, a perforator attached to and operated by said solenoid, a motor in series with the contact closed and opened by said time delay relay, a shaft driven by said motor, a pair of rollers, one of said rollers attached to said shaft, a paper track mounted beneath said perforator adjacent said rollers, and a roll of paper tape, said paper tape adapted to be driven through said paper track past said perforator by said rollers, the closing of said plate relay adapted to operate said solenoid, perforator and motor and to charge said condenser, said condenser adapted upon the opening of said plate relay to discharge through said time delay relay to hold said time delay relay contact closed and operate said motor after said plate relay has been opened to continue the movement of said paper tape past said perforator, and means for connecting said device to a suitable source of electrical supply.

3. A telephone dial recording device comprising an input socket adapted to receive a pulsed signal from a selected telephone line, a vacuum tube amplifier stage adapted to amplify said signal, a plate relay operated by the pulses of said amplified signal to close a pair of contacts, a time delay circuit in series with one contact of said plate relay, said time delay circuit comprising a time delay relay and condenser in parallel, said time delay relay adapted to close a contact upon the closing of contacts by said plate relay, said condenser adapted to charge upon the closing of said plate relay and to discharge through and hold briefly closed the contact of said time delay relay upon the opening of said plate relay, a motor in series with said contact of said time delay relay and adapted to operate upon the closing of said contact of said time delay relay, a perforator in series with the other contact of said plate relay, said perforator adapted to operate upon the closing of contacts by said plate relay, a strip of paper tape, said paper tape adapted to be moved longitudinally past said perforator by said motor and adapted to be punched by said perforator, the perforations in said paper tape constituting a record of the pulsed signals received by said device, and means for connecting said device to a suitable source of electrical supply.

4. A telephone dial recording device comprising an input socket adapted to receive a pulsed signal from a telephone line, an input transformer and a pair of vacuum tube amplifiers adapted to be operated by said amplified signal to open and close a pair of contacts, a time delay relay and condenser in parallel with each other and in series with one of the contacts of said plate relay, said condenser adapted to charge upon the closing of said plate relay contacts and to discharge through said time delay relay upon the opening of said contacts, said time delay relay adapted to open and close a contact, a tape perforator solenoid energized upon the closing of the other contact of said plate relay, said solenoid having a core normally held in an upward position and adapted to be pulled downwardly when said solenoid is energized, an arm attached to said core and adapted to move therewith, said arm pivotally attached adjacent one end to a shaft, said shaft adapted to be rotated upon the movement of said arm, a perforator arm pivotally attached adjacent one end to said shaft, said perforator arm having a perforator blade with a point, said perforator arm and blade adapted to be moved downwardly upon the energization of said solenoid, a motor adapted to be operated upon the closing of the contact of said time delay relay, a motor shaft driven by said motor, a pair of rollers positioned adjacent said perforator blade, one of said rollers attached to said motor shaft and adapted to rotate upon the rotation of said motor shaft, a paper track positioned beneath said perforator blade adjacent said rollers, a roll of paper tape having one end extending through said paper track and rollers, said paper to be adapted to be driven through said paper track past said perforator blade by the rotation of the roller attached to said motor shaft and means for connecting said device to a suitable source of electrical supply, said device adapted to record upon said paper tape a series of separated sets of perforations identical with the pulsed signals received from the selected telephone line.

WILLIAM J. BENNIS.

REFERENCES CITED

The following references are of record in the file of this patent:

UNITED STATES PATENTS

| Number | Name | Date |
|---|---|---|
| 1,194,378 | Goodrum | Aug. 15, 1916 |
| 1,196,855 | Goodrum | Sept. 5, 1916 |
| 1,795,656 | Massonneau | Mar. 10, 1931 |